(12) United States Patent
Fan et al.

(10) Patent No.: US 12,156,108 B2
(45) Date of Patent: Nov. 26, 2024

(54) TERMINAL APPLICATION ACTIVATION METHOD, APPARATUS, AND SYSTEM

(71) Applicant: Huawei Technologies Co., Ltd., Shenzhen (CN)

(72) Inventors: Shunan Fan, Beijing (CN); Li Zhu, Xi'an (CN); Xiaobo Yu, Shenzhen (CN); Shuiping Long, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 928 days.

(21) Appl. No.: 17/050,297

(22) PCT Filed: Apr. 25, 2019

(86) PCT No.: PCT/CN2019/084163
§ 371 (c)(1),
(2) Date: Oct. 23, 2020

(87) PCT Pub. No.: WO2019/206202
PCT Pub. Date: Oct. 31, 2019

(65) Prior Publication Data
US 2021/0235245 A1    Jul. 29, 2021

(30) Foreign Application Priority Data
Apr. 26, 2018   (CN) ................... 201810391848.X

(51) Int. Cl.
*G06F 9/54*     (2006.01)
*G06F 9/445*    (2018.01)
(Continued)

(52) U.S. Cl.
CPC .......... *H04W 4/60* (2018.02); *G06F 9/44505* (2013.01); *G06F 9/4843* (2013.01); *G06F 9/54* (2013.01);
(Continued)

(58) Field of Classification Search
CPC ....................................................... G06F 9/546
See application file for complete search history.

(56) References Cited

U.S. PATENT DOCUMENTS 9,607,449 B1 *  3/2017  Chen ..................... G07C 5/008
10,237,723 B2   3/2019  Borse
(Continued)

FOREIGN PATENT DOCUMENTS

CN    104883674 A    9/2015
CN    105101294 A    11/2015
(Continued)

OTHER PUBLICATIONS

"ISO/IEC 7816 Part 4: Interindustry command for interchange," Jul. 24, 2008, pp. 1-73, XP055278373, Retrieved from the Internet: URL:http://read.pudn.com/downloads132/doc/comm/563504/ISO-IEC 7816/ISO-IEC 7816-4.pdf.

*Primary Examiner* — Andy Ho
(74) *Attorney, Agent, or Firm* — Conley Rose, P.C.

(57) ABSTRACT

A terminal application activation method, apparatus, and system, applied to a terminal that includes a master chip and a security system, where the security system is coupled to the master chip through at least two data channels. The method includes obtaining application information of the security system, where the application information includes information about first applications to-be-activated, activating the first applications, allocating a corresponding data channel for each of the first applications, and performing data communication with the first applications through data channels corresponding to the first applications.

20 Claims, 7 Drawing Sheets

(51) Int. Cl.
*G06F 9/48* (2006.01)
*H04L 9/40* (2022.01)
*H04W 4/60* (2018.01)
*H04W 8/18* (2009.01)
*H04W 12/45* (2021.01)
*H04W 88/06* (2009.01)
*H04W 88/18* (2009.01)

(52) U.S. Cl.
CPC ............ *H04L 63/102* (2013.01); *H04W 8/183* (2013.01); *H04W 12/45* (2021.01); *H04W 88/06* (2013.01); *H04W 88/18* (2013.01)

(56) References Cited

U.S. PATENT DOCUMENTS

| | | |
|---|---|---|
| 2015/0350879 A1 | 12/2015 | Li et al. |
| 2016/0314309 A1* | 10/2016 | Rozak-Draicchio ........................ G06F 9/45558 |
| 2017/0164184 A1 | 6/2017 | Borse |
| 2019/0007824 A1 | 1/2019 | Jolibois et al. |
| 2019/0104401 A1 | 4/2019 | Park et al. |

FOREIGN PATENT DOCUMENTS

| | | |
|---|---|---|
| CN | 106987274 A | 7/2017 |
| CN | 108769983 A | 11/2018 |
| CN | 108777863 A | 11/2018 |
| EP | 01978772 A1 | 10/2008 |
| JP | 6231044 B2 | 11/2017 |
| WO | 2016127435 A1 | 8/2016 |
| WO | 2017109384 A1 | 6/2017 |
| WO | 2017164500 A1 | 9/2017 |

* cited by examiner

TERMINAL APPLICATION ACTIVATION METHOD, APPARATUS, AND SYSTEM

CROSS-REFERENCE TO RELATED APPLICATIONS

This application is a U.S. National Stage of International Patent Application No. PCT/CN2019/084163 filed on Apr. 25, 2019, which claims priority to Chinese Patent Application No. 201810391848.X filed on Apr. 26, 2018, both of which are hereby incorporated by reference in their entireties.

TECHNICAL FIELD

This application relates to the field of intelligent terminal technologies, and in particular, to a terminal application activation method, apparatus and system.

BACKGROUND

A current smart secure platform (secure smart platform, SSP) may support a removable subscriber identity module (subscriber identity module, SIM) card, an embedded SIM (embedded SIM, eSIM) card, an integrated SIM, and the like. The removable SIM card means that after purchasing a SIM card from a telecom operator, a user inserts the SIM card into a terminal, to use a communications service provided by the telecom operator. The eSIM card may also be referred to as an embedded universal integrated circuit card (embedded universal integrated circuit card, eUICC). The eSIM card is a secure element that can be used by a plurality of telecom operators to remotely manage a subscriber. The eSIM card may be placed in the terminal in a plug-in manner or a welding manner. The integrated SIM card may also be referred to as an integrated universal integrated circuit card (integrated UICC, iUICC). The integrated SIM card is integrated into the terminal in an internet protocol (internet protocol, IP) manner or a chip stacking manner. A plurality of applications may be installed on the SSP, including a profile (profile) for accessing an operator network and another application in the profile.

Currently, one SSP does not support simultaneous activation of a plurality of profiles. When a target profile needs to be activated, if there is an activated profile on the terminal, the terminal may release the activated profile, to activate the target profile. However, if the user needs to use communications services provided by different telecom operators at the same time, the plurality of profiles are simultaneously activated through a terminal that supports dual SIM dual standby or multi SIM multi standby. In the future, if an SSP is integrated into a chip, only one SSP is integrated for cost consideration, and dual SIM dual standby or multi SIM multi standby cannot be implemented. In addition, because the profile and the another application in the profile are not at a same level, when a profile of a telecom operator is activated, an application (application, App) in the profile is activated. For example, if a China Mobile profile is activated when a SIM card is used, Apps such as Mobile Package and Mobile Online Customer Service Center of China Mobile may be selected and activated. However, if an App of China Unicom is expected to be used, the App in a China Unicom Profile needs to be selected. Currently, on a new SSP platform, the application and the profile may belong to a same level.

How to simultaneously activate a plurality of applications (including profiles) of a same operator or different operators is a problem that needs to be resolved currently.

SUMMARY

Embodiments of this application provide a terminal application activation method, apparatus, and system, to activate different Apps on a security module.

According to a first aspect, an embodiment of this application provides a terminal application activation method. A terminal includes a master chip and a security module. The security module is connected to the master chip through at least two data channels. The method includes: obtaining, by the master chip, application information of the security module, where the application information includes information about at least two applications to-be-activated; and after activating, by the master chip, the at least two applications, and allocating a corresponding data channel for each of the at least two applications, performing, by the master chip, data communication with the at least two applications separately through data channels corresponding to the at least two applications.

In this embodiment of this application, when the at least two applications need to be activated, the corresponding data channel is allocated to each of the at least two applications, to effectively resolve a problem, in an existing solution, that only one profile and a plurality of Apps in the profile can be activated, but a plurality of profiles or one profile and another App that is installed on the security module and that is in parallel with the profile cannot be activated. This can implement a multi SIM multi standby function, and reduce hardware costs.

In a possible implementation, the obtaining, by the master chip, application information of the security module includes: sending, by the master chip, an initialization request message to the security module when the security module is powered on: sending, by the security module, an initialization response message including the application information to the master chip, and receiving, by the master chip, the initialization response message. The initialization response message further includes a first indication message. The first indication message includes at least one of capability information used to indicate that the security module supports simultaneous activation of at least two applications and information about a maximum quantity of data channels supported by the security module.

In this embodiment of this application, the master chip interacts with the security module, so that the master chip can learn a capability, of the security module, of supporting simultaneous activation of at least two applications, and may establish a communication connection between the master chip and the security module through the interaction, to subsequently allocate data channels to different Apps.

In a possible implementation, after the receiving, by the master chip, the initialization response message, the method further includes: sending, by the master chip, second indication information to the security module. The second indication information includes at least one of capability information used to indicate that the master chip supports simultaneous activation of at least two applications and information about a maximum quantity of data channels supported by the master chip.

In this embodiment of this application, the master chip sends the second indication information to the security module, so that the security module can learn a capability;

of the master chip, of supporting simultaneous activation of at least two applications. This achieves mutual confirmation.

In a possible implementation, the allocating a corresponding data channel for each of the at least two applications includes: when a first quantity is less than or equal to a second quantity, allocating the corresponding data channel for each of the at least two applications. The first quantity is a quantity of the at least two applications. The second quantity is the maximum quantity of data channels supported by the security module.

In this embodiment of this application, when the first quantity is less than or equal to the second quantity, the corresponding data channel is allocated to each of the at least two applications to-be-activated, to implement multi SIM multi standby, and isolate different applications. A receiving and sending relationship between the different applications is independent, so that interference and mis-receiving problems can be resolved, to improve security of a physical connection.

In a possible implementation, the allocating a corresponding data channel for each of the at least two applications includes: when the first quantity is greater than the second quantity, determining a first application from the at least two applications and allocating a corresponding data channel for each of the first application. A priority of the first application is higher than a reference priority; and a quantity of first applications is less than or equal to the second quantity.

In this embodiment of this application, when a quantity of data channels between the security module and the master chip is greater than a quantity of data channels on the security module, a data channel is preferentially allocated to an application with a high priority, so that user satisfaction can be improved, and low user satisfaction caused by allocating the data channel to an application with a low priority can be avoided.

In a possible implementation, the at least two applications include a second application. The allocating a corresponding data channel for each of the at least two applications includes: when the data channel has been allocated to a third application, releasing the third application and allocating the data channel to the second application. A priority of the second application is higher than a priority of the third application. The third application does not belong to an application of the at least two applications.

In a possible implementation, when the second application is a network access application (network access application, NAA), the data channel is a data channel between the security module and a modem (modem). Alternatively, when the second application is a non-NAA, the data channel is a data channel between the security module and a central processing unit.

In this embodiment of this application, the data channel between the security module and the modem or the central processing unit is established based on whether the application is an NAA, to effectively reduce a processing workload of the modem.

In a possible implementation, the first indication information further includes at least one of information about a quantity of applications installed on the security module and information about a maximum quantity of applications that can be installed on the security module.

In a possible implementation, the method further includes: expanding, by the master chip, at least two logical channels based on the data channel.

In this embodiment of this application, after allocating the corresponding data channel to each of the at least two applications to-be-activated, the master chip may further expand at least two logical channels for the data channel corresponding to each application, to improve a data concurrency amount and a data processing speed.

According to a second aspect, an embodiment of this application further provides a terminal application activation method. The method is applied to a security module. The security module is connected to a master chip through at least two data channels. The method includes: sending application information of the security module to the master chip; and after the master chip allocates a corresponding data channel to each of the at least two applications, performing, by the security module, data communication with the master chip separately through data channels corresponding to the at least two applications. The application information includes information about at least two applications to-be-activated. The application information is used to indicate to allocate the corresponding data channel for each of the at least two applications.

In a possible implementation, before the sending application information of the security module to the master chip, the method further includes: receiving, by the security module, an initialization request message from the master chip when the security module is powered on. The sending application information of the security module to the master chip includes: sending, by the security module, an initialization response message including the application information to the master chip. The initialization response message further includes first indication information. The first indication information includes at least one of capability information used to indicate that the security module supports simultaneous activation of at least two applications and information about a maximum quantity of data channels supported by the security module.

In a possible implementation, after the sending, by the security module, an initialization response message to the master chip, and before the performing, by the security module, data communication with master chip separately through data channels corresponding to the at least two applications, the method further includes: receiving, by the security module, second indication information from the master chip. The second indication information includes at least one of capability information used to indicate that the master chip supports simultaneous activation of at least two applications and information about a maximum quantity of data channels supported by the master chip.

According to a third aspect, an embodiment of this application further provides a terminal application activation method. The method is applied to a master chip. The master chip is connected to a security module through at least two data channels. The method includes: obtaining, by the master chip, application information of the security module, where the application information includes information about at least two applications to-be-activated; activating, by the master chip, the at least two applications, and allocating a corresponding data channel for each of the at least two applications; and performing, by the master chip, data communication with the at least two applications separately through data channels corresponding to the at least two applications.

In a possible implementation, the obtaining, by the master chip, application information of the security module includes: sending, by the master chip, an initialization request message to the security module when the security module is powered on; and receiving, by the master chip, an initialization response message including the application information from the security module. The initialization response message further includes first indication information. The first indication information includes at least one of capability information used to indicate that the security module supports simultaneous activation of at least two applications and information about a maximum quantity of data channels supported by the security module.

In a possible implementation, after the receiving, by the master chip, an initialization response message, the method further includes: sending, by the master chip, second indication information to the security module. The second indication information includes at least one of capability information used to indicate that the master chip supports simultaneous activation of at least two applications and information about a maximum quantity of data channels supported by the master chip.

In a possible implementation, the allocating a corresponding data channel for each of the at least two applications includes: when a first quantity is less than or equal to a second quantity; allocating the corresponding data channel for each of the at least two applications. The first quantity is a quantity of the at least two applications. The second quantity is the maximum quantity of data channels supported by the security module.

In a possible implementation, the allocating a corresponding data channel for each of the at least two applications includes: when the first quantity is greater than the second quantity, determining a first application from the at least two applications and allocating a corresponding data channel for each of the first application. A priority of the first application is higher than a reference priority; and a quantity of first applications is less than or equal to the second quantity.

In a possible implementation, the at least two applications include a second application. The allocating a corresponding data channel for each of the at least two applications includes: when the data channel has been allocated to a third application, releasing the third application and allocating the data channel to the second application. A priority of the second application is higher than a priority of the third application. The third application does not belong to an application of the at least two applications.

In a possible implementation, when the second application is a network access application NAA, the data channel is a data channel between the security module and a modem. Alternatively, when the second application is a non-NAA, the data channel is a data channel between the security module and a central processing unit.

In a possible implementation, the first indication information further includes at least one of information about a quantity of applications installed on the security module and information about a maximum quantity of applications that can be installed on the security module.

In a possible implementation, the method further includes: expanding, by the master chip, at least two logical channels based on the data channel.

According to a fourth aspect, an embodiment of this application provides a terminal application activation system. The system includes a master chip and a security module. The security module is connected to the master chip through at least two data channels. The master chip is configured to obtain application information of the security module. The application information includes information about at least two applications to-be-activated. The master chip is further configured to activate the at least two applications, and allocate a corresponding data channel for each of the at least two applications. The master chip is further configured to perform data communication with the at least two applications separately through data channels corresponding to the at least two applications.

In a possible implementation, the master chip is further configured to send an initialization request message to the security module when the security module is powered on. The security module is configured to send an initialization response message including the application information to the master chip. The initialization response message further includes first indication information. The first indication information includes at least one of capability information used to indicate that the security module supports simultaneous activation of at least two applications and information about a maximum quantity of data channels supported by the security module. The master chip is further configured to receive the initialization response message.

In a possible implementation, the master chip is further configured to send second indication information to the security module. The second indication information includes at least one of capability information used to indicate that the master chip supports simultaneous activation of at least two applications and information about a maximum quantity of data channels supported by the master chip.

In a possible implementation, the master chip is specifically configured to: when a first quantity is less than or equal to a second quantity, allocate the corresponding data channel for each of the at least two applications. The first quantity is a quantity of the at least two applications. The second quantity is the maximum quantity of data channels supported by the security module.

In a possible implementation, the master chip is specifically configured to: when the first quantity is greater than the second quantity, determine a first application from the at least two applications and allocate a corresponding data channel for each of the first application. A priority of the first application is higher than a reference priority, and a quantity of first applications is less than or equal to the second quantity.

In a possible implementation, the at least two applications include a second application. The master chip is specifically configured to: when the data channel has been allocated to a third application, release the third application and allocate the data channel to the second application. A priority of the second application is higher than a priority of the third application. The third application does not belong to an application of the at least two applications.

In a possible implementation, when the second application is a network access application NAA, the data channel is a data channel between the security module and a modem. Alternatively, when the second application is a non-NAA, the data channel is a data channel between the security module and a central processing unit.

In a possible implementation, the first indication information further includes at least one of information about a quantity of applications installed on the security module and information about a maximum quantity of applications that can be installed on the security module.

In a possible implementation, the master chip is further configured to expand at least two logical channels based on the data channel.

According to a fifth aspect, an embodiment of this application further provides a security module, including: a sending unit, configured to send application information of the security module to the master chip, where the application information includes information about at least two applications to-be-activated, and the application information is used to indicate to allocate data channels to the at least two applications; and a communications unit, configured to: after the master chip allocates a corresponding data channel for each of the at least two applications, perform data communication with the master chip separately through data channels corresponding to the at least two applications.

In a possible implementation, the security module further includes: a receiving unit, configured to receive an initialization request message from the master chip when the security module is powered on. The sending unit is specifically configured to send an initialization response message including the application information to the master chip. The initialization response message further includes first indication information. The first indication information includes at least one of capability information used to indicate that the security module supports simultaneous activation of at least two applications and information about a maximum quantity of data channels supported by the security module.

In a possible implementation, the receiving unit is further configured to receive second indication information from the master chip. The second indication information includes at least one of capability information used to indicate that the master chip supports simultaneous activation of at least two applications and information about a maximum quantity of data channels supported by the master chip.

According to a sixth aspect, an embodiment of this application further provides a master chip, including: an obtaining unit, configured to obtain application information of a security module, where the application information includes information about at least two applications to-be-activated: an activation unit, configured to activate the at least two applications: an allocation unit, configured to allocate a corresponding data channel for each of the at least two applications; and a communications unit, configured to perform data communication with the at least two applications separately through data channels corresponding to the at least two applications.

In a possible implementation, the obtaining unit includes: a sending subunit, configured to send an initialization request message to the security module when the security module is powered on; and a receiving subunit, configured to receive an initialization response message including the application information from the security module. The initialization response message further includes first indication information. The first indication information includes at least one of capability information used to indicate that the security module supports simultaneous activation of at least two applications and information about a maximum quantity of data channels supported by the security module.

In a possible implementation, the sending subunit is further configured to send second indication information to the security module. The second indication information includes at least one of capability information used to indicate that the master chip supports simultaneous activation of at least two applications and information about a maximum quantity of data channels supported by the master chip.

In a possible implementation, the allocation unit is specifically configured to: when a first quantity is less than or equal to a second quantity, allocate the corresponding data channel for each of the at least two applications. The first quantity is a quantity of the at least two applications. The second quantity is the maximum quantity of data channels supported by the security module.

In a possible implementation, the allocation unit is specifically configured to: when the first quantity is greater than the second quantity; determine a first application from the at least two applications and allocate a corresponding data channel for each of the first application. A priority of the first application is higher than a reference priority, and a quantity of first applications is less than or equal to the second quantity.

In a possible implementation, the at least two applications include a second application. The allocation unit is specifically configured to: when the data channel has been allocated to a third application, release the third application and allocate the data channel to the second application. A priority of the second application is higher than a priority of the third application. The third application does not belong to an application of the at least two applications.

In a possible implementation, when the second application is a network access application NAA, the data channel is a data channel between the security module and a modem. Alternatively, when the second application is a non-NAA, the data channel is a data channel between the security module and a central processing unit.

In a possible implementation, the first indication information further includes at least one of information about a quantity of applications installed on the security module and information about a maximum quantity of applications that can be installed on the security module.

In a possible implementation, the master chip further includes an expansion unit, configured to expand at least two logical channels based on the data channel.

According to a seventh aspect, an embodiment of this application further provides a security module, to implement the foregoing terminal application activation methods. The security module includes a processor, a memory, and a communications interface. The processor is connected to the memory and the communications interface through a cable. The memory is configured to store a program. The processor is configured to execute the program stored in the memory, so that the processor performs a corresponding function in the methods described in the first aspect and the second aspect. The communications interface is configured to support communication between the security module and another network element.

According to an eighth aspect, an embodiment of this application further provides a master chip, to implement the foregoing terminal application activation methods. The master chip includes a processor, a memory, and a communications interface. The processor is connected to the memory and the communications interface through a cable. The memory is configured to store a program. The processor is configured to execute the program stored in the memory, so that the processor performs a corresponding function in the methods described in the first aspect and the third aspect. The communications interface is configured to support communication between the security module and another network element.

According to a ninth aspect, an embodiment of this application further provides a terminal, including a master chip and a security module. The master chip is configured to perform a corresponding function in the methods described in the first aspect and the third aspect. The security module is configured to perform a corresponding function in the methods described in the first aspect and the second aspect. The master chip may alternatively be the master chip described in the sixth aspect. The security module may alternatively be the security module described in the fifth aspect.

According to a tenth aspect, an embodiment of this application further provides a computer-readable storage medium. The computer-readable storage medium stores a program instruction, and when the program instruction is run on a computer, the computer is enabled to perform the methods in the foregoing aspects.

According to an eleventh aspect, an embodiment of this application further provides a computer program product including an instruction. When the instruction is run on a computer, the computer is enabled to perform the methods in the foregoing aspects.

DESCRIPTION OF EMBODIMENTS

The following describes the embodiments of this application with reference to the accompanying drawings in the embodiments of this application.

In the embodiments of this application, an SSP may be a running platform of a security module. A plurality of Apps may be installed on the SSP platform. These Apps may be profiles for accessing an operator network, or may be a payment App, a driver license or another identity identification App, a home network-related App, an internet of vehicles-related App, a mobile health-related App, a wearable App, an artificial intelligence-related App, and the like. These Apps may be simultaneously activated on the SSP platform. To be specific, on a new SSP platform, an App and a profile may belong to an App of a same level. In other words, the App and the profile may run in parallel. By comparison, an App in the profile can be activated only after the profile is activated. Therefore, that the App and the profile are of the same level means that the App and the profile may be simultaneously activated. For example, at least two profiles may be simultaneously activated, or at least one profile and at least one App may be simultaneously activated, or at least two Apps may be simultaneously activated.

The profile may be a general name of a series of files and data related to a mobile network operator (mobile network operator, MNO) on the security module. It may be understood that the profile described herein is merely an example, and in another implementation, the profile may be another description. The description of the profile should not be construed as a limitation on this application.

Figure 1:
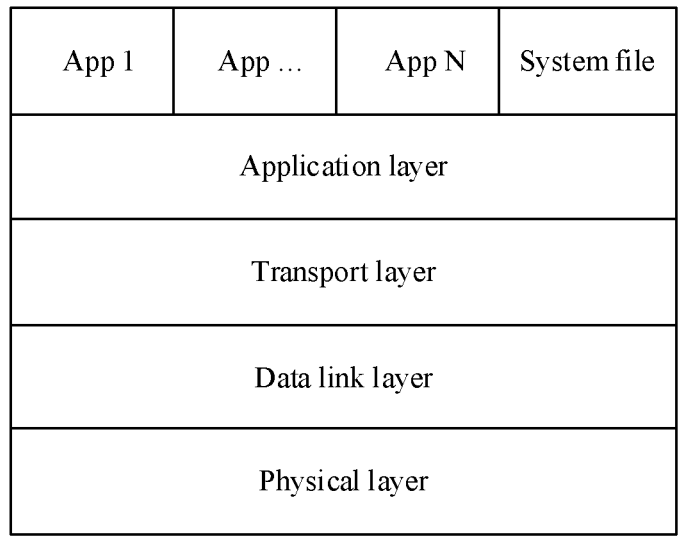
FIG. 1 is a schematic diagram of a protocol stack architecture of an SSP according to an embodiment of this application.

FIG. 1 is a schematic diagram of a protocol stack architecture of an SSP according to an embodiment of this application. The protocol stack architecture includes a physical layer, a data link layer, a transport layer, and an application layer. The physical layer may provide a physical interface between the SSP and a terminal. For example, the physical layer supports interface protocols such as an international organization for standardization (international organization for standardization, ISO) 7816, a serial peripheral interface (serial peripheral interface, SPI), an inter-integrated circuit (inter-integrated circuit, I2C), and a single wire protocol (single wire protocol, SWP). The data link layer may support protocols such as the ISO 7816. The transport layer may support an application protocol data unit (application protocol data unit, APDU), an HCP protocol, and the like. The application layer supports the ISO-7816, the APDU protocol, a hypertext transfer protocol (hyper text transfer protocol, HTTP), a constrained application protocol (constrained application protocol, CoAP), and the like.

Figure 2A:
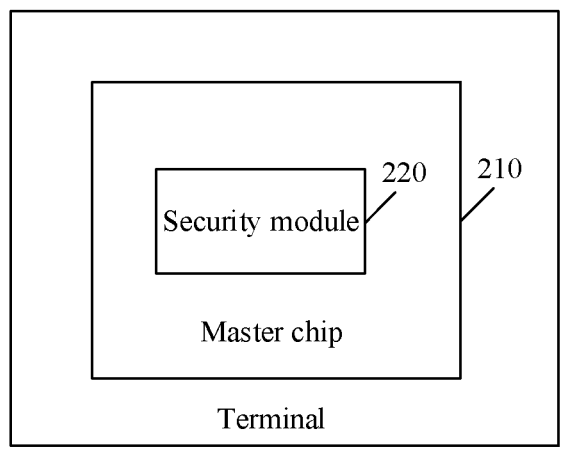
FIG. 2a is a schematic structural diagram of a terminal according to an embodiment of this application.
Figure 2B:
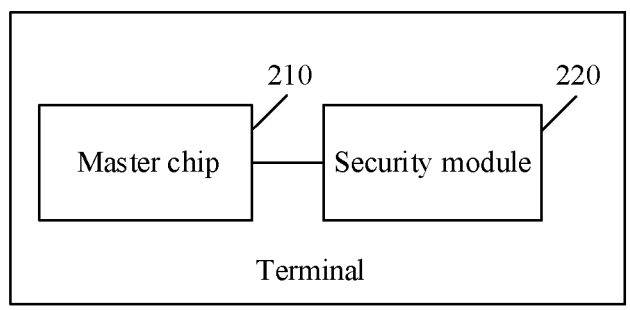
FIG. 2b is a schematic structural diagram of a terminal according to an embodiment of this application.

FIG. 2a and FIG. 2b are structural block diagrams of an implementation provided by using a terminal as an example. As shown in the figures, the terminal may include a master chip 210 and a security module 220. It may be understood that the security module 220 may be embedded into the master chip 210, as shown in FIG. 2a. Alternatively, the security module 220 may be independent of the master chip 210, as shown in FIG. 2b. A specific form of the master chip and the security module is not limited in this embodiment of this application.

The terminal in this application may be a mobile phone, a tablet computer, a notebook computer, a palmtop computer, a mobile internet device (mobile internet device, MID), or the like. A specific implementation of the terminal is not limited in this embodiment of this application. It may be understood that the terminal in this embodiment of this application may also be referred to as a terminal device or the like.

Figure 3A:
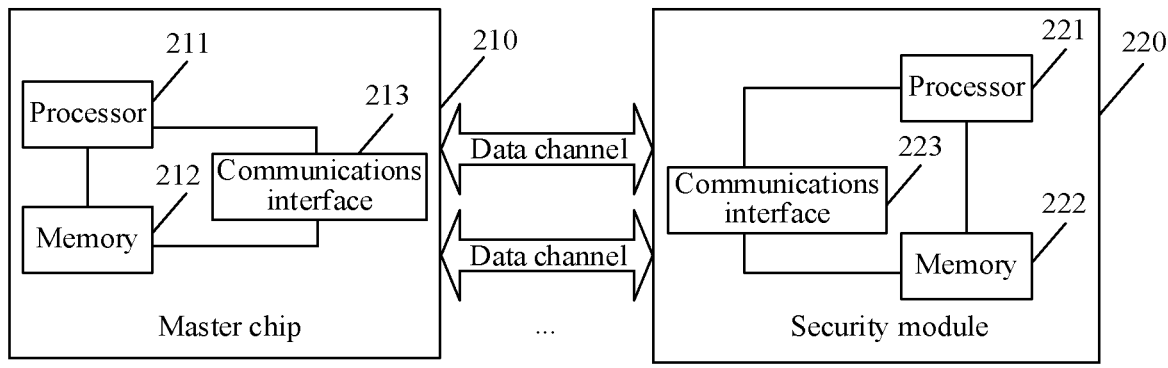
FIG. 3a is a schematic diagram of an architecture of a terminal application activation system according to an embodiment of this application.

FIG. 3a is a schematic diagram of an architecture of a terminal application activation system according to an embodiment of this application. As shown in FIG. 3a, the system includes a master chip 210 and a security module 220. The master chip 210 may be connected to the security module 220 through at least two data channels.

As shown in FIG. 3a, the master chip may include a processor 211 and a memory 212. The memory 212 may be configured to store a program. The processor 211 may be configured to execute the program stored in the memory: The master chip may further include a communications interface 213. The master chip may interact, for example, communicate data or an instruction, with the security module through the communications interface 213. It may be understood that the communications interface 213 may also interact with another device, or the like. This is not limited in this embodiment of this application.

Specifically, the security module may include a processor 221 and a memory 222. The memory 222 may be configured to store a program, and the processor 221 may be configured to execute the program stored in the memory: The security module may also include a communications interface 223. Through the communications interface 223, the security module interacts with the master chip, or the like. It may be understood that a specific implementation of the communications interface is not uniquely limited in this embodiment of this application.

Specifically, the data channel may also be understood as a physical channel, and may be used to transmit the data and/or the instruction between the security module and the master chip. The data channel is allocated to an application (for example, an application of at least two applications to-be-activated) that independently runs on the security module for dedicated use, and is physically isolated from another application. In other words, the application does not share the data channel with the another application. Further, the master chip may expand at least two logical channels on each data channel, and different logical channels on the same expanded data channel may be allocated to a sub-application of a same application for use. To be specific, two data channels shown in FIG. 3a are used as an example. The master chip may separately expand at least two logical channels on each of the two data channels. The logical channel may also be used to transmit the data and/or the instruction between the security module and the master chip. A difference lies in that the master chip may allocate different logical channels to different types of data based on a type of data, and may also allocate different logical channels to different instructions based on a type of an instruction. For example, the application is a profile. After a data channel is allocated to the profile, the master chip may expand two logical channels. The two logical channels may be separately used to transmit information such as a dedicated file, a basic file, and a sub-application carried in the profile. It may be understood that the foregoing is merely an example, and should not be construed as a limitation on this embodiment of this application.

The master chip may be the master chip in FIG. 2a or FIG. 2b. The security module may be a hardware module or a software module installed on a device, such as a SIM card in any form, an SSP, a hardware secure element (secure element, SE), a system on chip (system on chip, SoC), or a system in package (system in package, SIP). At least one operator profile that connects to a network and performs communication through the network may be installed on the security module. Another App at a level parallel to the profile, for example, a payment App, a driver license or another identity identification App, a home network-related App, an Internet of Vehicles-related App, a mobile health-related App, a wearable App, or an artificial intelligence-related App, may also be installed on the security module.

It may be understood that the security module provided in this embodiment of this application may be an independent module, or may be integrated into a terminal.

Figure 3B:
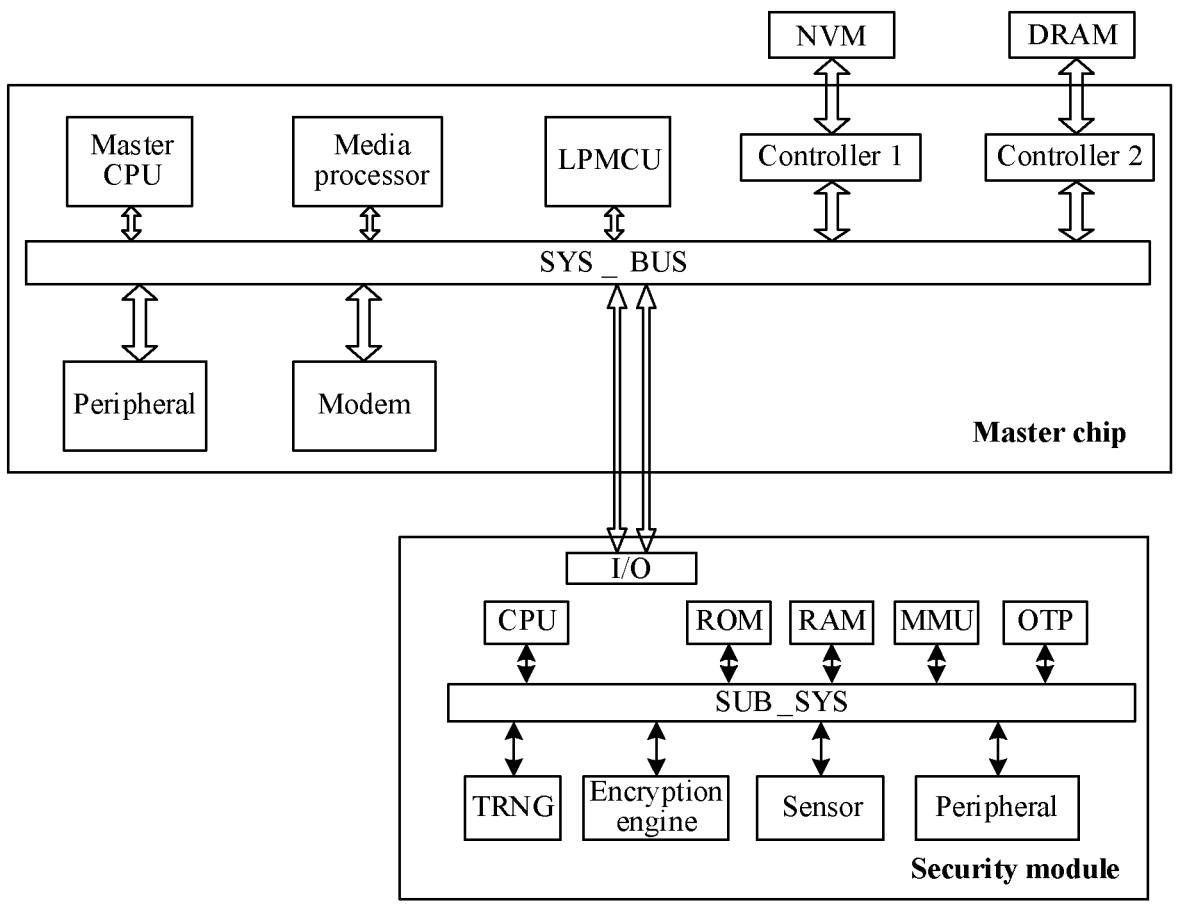
FIG. 3b is a schematic diagram of a specific architecture of a terminal application activation system according to an embodiment of this application.

To better understand the system provided in this embodiment of this application, FIG. 3b is a schematic diagram of a specific architecture of the terminal application activation system according to this embodiment of this application. The master chip may include elements such as a master central processing unit (central processing unit, CPU), a media processor (media processor), a low power microcontroller unit (low power micro controller unit, LPMCU), a peripheral (peripherals), a modem (modem), a controller (controller), a non-volatile memory (non-volatile memory; NVM), and a dynamic random access memory (dynamic random access memory; DRAM). The master CPU or the media processor may be configured to be coupled to the memory; to execute a program instruction or the like stored in the memory. For example, the master CPU may perform step 402 shown in FIG. 4. The peripheral may include devices such as an input and output device, an external memory; an analog-to-digital converter, a digital-to-analog converter, and a peripheral processor. For example, the peripheral device may include a touchscreen, a camera, a fingerprint collector, a near field communication element, a sensor, and the like. A specific device included in the peripheral is not limited in this embodiment of this application. The controller may include a controller 1 and a controller 2. The controller 1 is connected to the NVM, and the controller 2 is connected to the DRAM.

The security module may include elements such as a CPU, a read-only memory (read-only memory; ROM), a random access memory (random access memory, RAM), a memory management unit MMU (memory management unit), a one-time programmable chip (one time programmable, OTP), and a true random number generator (true random number generator, TRNG), an encryption engine (such as crypto), a sensor (sensors), a peripheral, and a signal input/output connection line between the security module and the master chip.

The ROM and the RAM shown in this embodiment of this application are merely examples. In a specific implementation, the security module may further include another type of memory. This is not limited in this embodiment of this application. The MMU may be used to manage a virtual memory system.

The OTP is also referred to as on-time-password. A time-related and unpredictable random number combination may be generated every 60 seconds according to a dedicated algorithm. Each password can be used only once. The encryption engine can effectively improve data security of the security module.

Specifically, in the system architecture provided in this embodiment of this application, the security module may be an isolated security subsystem, and communicates with an element such as the master chip through a bus. The bus used for communication may be a dedicated mailbox (mailbox), or may be a general-purpose bus bridge or the like. This is not limited in this embodiment of this application. The bus may include a plurality of physical connections, so that the master chip can allocate different data channels to the security module, to implement multi SIM multi standby and parallel data processing. The data transmitted through the data channel may be stored in an external NVM. Alternatively, the data may be stored in the SoC, the security module, or the like in another manner. This is not limited in this embodiment of this application.

It may be understood that the master chip and the security module shown above are merely examples provided in this embodiment of this application, and the master chip and/or the security module may have more or fewer components than the shown components, or may combine two or more components, or may have different component configurations.

It may be understood that the system provided in this embodiment of this application may be integrated into the terminal, so that a user can use the terminal conveniently.

Figure 4:
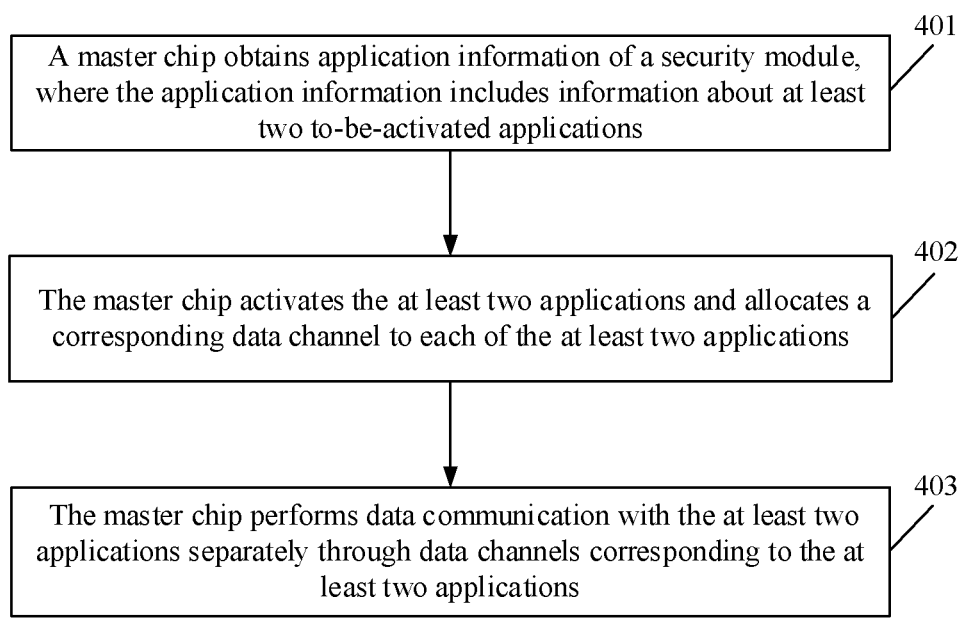
FIG. 4 is a schematic flowchart of a terminal application activation method according to an embodiment of this application.

FIG. 4 is a schematic flowchart of a terminal application activation method according to an embodiment of this application. The terminal application activation method may include the following steps.

401: A master chip obtains application information of a security module, where the application information includes information about at least two applications to-be-activated.

In this embodiment of this application, the application may be an application on the security module. The application may include a profile of an operator and another application at a level parallel to the profile, for example, a payment application, an identity identification application, or an artificial intelligence application. For example, the security module may include N applications. N is greater than or equal to 2. There may be M to-be-activated applications, and M is less than or equal to N. It may be understood that a specific quantity of the at least two applications to-be-activated is not limited in this embodiment of this application.

For example, 10 applications are installed on the security module, and the 10 applications do not necessarily need to perform data communication with the master chip. For example, in a current phase, only four applications may need to perform data communication with the master chip. Therefore, the master chip may activate the four applications by obtaining the application information of the security module.

The application information obtained by the master chip includes the information about the at least two applications to-be-activated. In a possible implementation, for example, the application information obtained by the master chip may include information about all applications installed on the security module, and then the master chip determines the at least two applications to-be-activated based on a priority of each application (an application installed on the security module). In another possible implementation, the security module determines the at least two applications to-be-activated based on the information about all the applications installed on the security module and the priority of each application (the application installed on the security module).

In a possible implementation, this embodiment of this application provides two specific methods for obtaining the application information, as shown in the following:

Implementation 1: That a master chip obtains application information of a security module includes: the master chip sends an initialization request message to the security module when the security module is powered on: the security module sends an initialization response message including the application information to the master chip; and the master chip receives the initialization response message. The initialization response message further includes first indication information. The first indication information includes at least one of capability information used to indicate that the security module supports simultaneous activation of at least two applications and information about a maximum quantity of data channels supported by the security module.

Optionally, the first indication information may further include at least one of information about a quantity of applications installed on the security module and information about a maximum quantity of applications that can be installed on the security module. The information about the quantity of applications installed on the security module may be used to obtain a quantity of applications that may be simultaneously activated by the security module. The information about the quantity of applications installed on the security module may further be used to determine whether a maximum quantity of data channels supported by the master chip can meet the quantity of applications installed on the security module. The information about the maximum quantity of applications that can be installed on the security module may be used by the master chip to determine a quantity of applications that may be installed on the security module and that are simultaneously activated, to determine whether the maximum data channels supported by the master chip can meet the quantity of applications that may be installed on the security module and that may be simultaneously activated. In this way, a beneficial effect of improving user experience by accurately allocating a data channel is achieved.

For the implementation 1, the security module determines the at least two applications to-be-activated, to send the application information including the at least two applications to-be-activated to the master chip, so that the master chip may directly obtain the application information from the initialization response message sent by the security module. In other words, the information about the at least two applications to-be-activated is directly obtained. In addition, the master chip can also learn the maximum quantity of data channels that can be supported by the security module, so that the master chip can learn an exact quantity of applications that can be activated. In other words, a specific quantity of applications that can be activated by the master chip may be determined based on the maximum quantity of data channels supported by the security module.

Implementation 2: That a master chip obtains application information of a security module includes: the master chip sends an initialization request message to the security module when the security module is powered on: the security module sends an initialization response message to the master chip; and the master chip receives the initialization response message and determines the application information based on the initialization response message. The initialization response message includes first indication information. The first indication information includes information about the applications installed on the security module.

Optionally; the first indication information may further include at least one piece of the following information: capability information used to indicate that the security module supports simultaneous activation of at least two applications, information about a maximum quantity of data channels supported by the security module, and information about a maximum quantity of applications that can be installed on the security module.

For the implementation 2, after receiving the initialization response message sent by the security module, the master chip may independently determine, based on the initialization response message, applications to be activated, so that the master chip can determine, based on a processing capability of the master chip, a quantity of applications to be activated.

Specifically; the security module, to the master chip, the capability information used to indicate that the security module supports simultaneous activation of at least two applications and the information about the maximum quantity of data channels supported by the security module, so that the master chip can determine whether the security module supports a plurality of data channels and the maximum quantity of data channels that can be supported.

It may be understood that whether the security module determines the at least two applications to-be-activated or the master chip determines the at least two applications to-be-activated, a determining method may be determined based on priorities, and may be specifically determined based on a use frequency of each application, or the like. The determining method is not uniquely limited in this embodiment of this application.

In a possible implementation, based on the two provided specific methods for obtaining the application information, after the master chip receives the initialization response message, the method further includes:

sending, by the master chip, second indication information to the security module, where the second indication information includes at least one of capability information used to indicate that the master chip supports simultaneous activation of at least two applications and information about the maximum quantity of data channels supported by the master chip.

In this embodiment of this application, after the master chip receives the first indication information of the security module, the master chip may further send the second indication information to the security module, so that whether the master chip supports the simultaneous activation of at least two applications can further be determined. It may be understood that in this embodiment of this application, the security module needs to be connected to the master chip through the data channel, so that the maximum quantity of data channels supported by the security module is the same as the maximum quantity of data channels supported by the master chip.

402: The master chip activates the at least two applications and allocates a corresponding data channel for each of the at least two applications.

In this embodiment of this application, the master chip may allocate one data channel for each of the at least two applications. If the application information includes M to-be-activated applications, the master chip may allocate one data channel to each of the M applications (that is, M data channels in total).

That the master chip activates an application may be specifically that the master chip establishes a communication channel with the application, reads application data, and sends the application data to a corresponding processing module to complete a service in the application. Certainly, the method for activating the application by the master chip is merely an example, and should not be construed as a limitation on this embodiment of this application.

In a possible implementation, this embodiment of this application further provides two data channel allocation scenarios, as shown in the following:

Scenario 1: Allocating the corresponding data channel for each of the at least two applications includes: when a first quantity is less than or equal to a second quantity; allocating the corresponding data channel for each of the at least two applications. The first quantity is a quantity of the at least two applications. The second quantity is the maximum quantity of data channels supported by the security module.

It may be understood that the second quantity is also the maximum quantity of data channels supported by the master chip. In this scenario, the master chip may allocate one data channel to each application included in the at least two applications to-be-activated.

Scenario 2: The allocating the corresponding data channel for each of the at least two applications includes: when the first quantity is greater than the second quantity; determining a first application from the at least two applications and allocating a corresponding data channel for each of the first application. A priority of the first application is higher than a reference priority, and a quantity of first applications is less than or equal to the second quantity.

In this scenario, because the master chip cannot allocate one data channel to each of the at least two applications to-be-activated, the master chip may first determine an application, namely; the first application, whose priority is higher than the reference priority; to allocate the corresponding data channel for each of the first application. It may be understood that there may be one or at least two first applications. This is not limited in this embodiment of this application. The reference priority may be independently set by the master chip, or the reference priority may be dynamically updated based on the maximum quantity of data channels supported by the master chip. How to set the reference priority is not limited in this embodiment of this application.

In a possible implementation, based on the described embodiment, the two described implementations of obtaining the application information, and the two described data channel allocation scenarios, this embodiment of this application further provides a data channel allocation method, as shown in the following:

The at least two applications include a second application, and the allocating the corresponding data channel for each of the at least two applications includes: when the data channel has been allocated to a third application, releasing the third application and allocating the data channel to the second application, where a priority of the second application is higher than a priority of the third application, and the third application does not belong to an application of the at least two applications.

The scenario 1 and the scenario 2 are shown in a scenario in which the data channel is not allocated to another application. However, this embodiment of this application is shown in a scenario in which the data channel is allocated to the another application. If the at least two applications to-be-activated include the second application, the master chip needs to allocate a data channel such as a first data channel to the second application. When allocating the data channel, the master chip detects that the first data channel has been allocated to the third application. If the priority of the second application is higher than the priority of the third application, the master chip may release the third application, to allocate the first data channel to the second application. It may be understood that the first data channel is merely an example, and does not indicate a sequence.

It may be understood that when the priority of the second application is lower than the priority of the third application, the master chip may temporarily switch the first data channel to the second application for use when the third application has no service data. When the third application has service data, regardless of whether the second application is transmitting service data, the service data of the second application is temporarily buffered, and the first data channel is switched to the third application. Until the third application no longer has service data to be transmitted, the buffered service data of the second application is read, and the first data channel is switched to the second application for use.

It may be understood that a comparison principle of the priorities may be based on a use frequency of an application, a preference of a user, use duration of the user, or the like. This is not limited in this embodiment of this application.

It may be understood that when the master chip allocates the corresponding data channel for each of the at least two applications, an identifier of the data channel may further be carried. In this way, a correspondence between a data channel and an application can be effectively distinguished, so that data transmission efficiency is higher.

403: The master chip performs data communication with the at least two applications separately through data channels corresponding to the at least two applications.

In this embodiment of this application, the master chip may perform data communication with the at least two applications to-be-activated separately through the data channels corresponding to the at least two applications. If the at least two applications to-be-activated include the second application and a fourth application, after the master chip allocates a data channel such as a second data channel to the second application and allocates a data channel such as a third data channel to the fourth application, the master chip may perform data communication with the second application through the second data channel, and perform data communication with the fourth application through the third data channel. It may be understood that the second data channel and the third data channel are merely examples and do not indicate a sequence, and the second application and the fourth application are also merely examples and do not indicate a sequence.

In a possible implementation, when the second application is an NAA, the data channel is a data channel between the security module and a modem. Alternatively, when the second application is a non-NAA, the data channel is a data channel between the security module and a central processing unit.

In other words, there may be two types of data channels in this embodiment of this application. One may be the data channel between the security module and the modem, and the other may be the data channel between the security module and the CPU. When allocating data channels to at least two applications to-be-activated, the master chip may further determine whether an application such as the second application is an NAA. If the second application is an NAA, a data channel between the second application and the modem is allocated to the second application. If the second application is a non-NAA, a data channel between the second application and the CPU is allocated to the second application.

Alternatively, there may be only one type of data channel in this embodiment of this application. In other words, the data channel may be the data channel between the security module and the modem, or the data channel between the security module and the central processing unit.

Specifically, the data channel in this embodiment of this application is a data channel between the main chip and the security module, for example, a data channel that supports a bus protocol. Therefore, the data channel in this embodiment of this application may transmit an application protocol data unit (application protocol data unit, APDU) instruction, an abstract syntax notation (abstract syntax notation one, ASN.1) instruction, a start answer instruction, and the like.

Implementation of this embodiment of this application can effectively resolve a problem that a same security module cannot simultaneously activate a plurality of applications or a plurality of profiles, so that the security module can implement a multi SIM multi standby function and a multi-application function. This fundamentally reduces hardware costs. In addition, the activated applications are connected to the master chip through respective data channels. This implements security isolation. In addition, disabling one data channel does not affect another data channel, and congestion of one data channel does not affect receiving and sending of another data channel.

It may be understood that the terminal application activation method shown in FIG. 4 may be applied to an initialization process of the master chip and the security module, and may also be applied to a case in which the master chip has activated an application such as a fifth application (an application on the security module), the security module further includes a sixth application, and the security module requires the master chip to activate the sixth application. In this case, the master chip may also activate the sixth application by obtaining the application information of the security module, and allocate a data channel to the sixth application. In this scenario, the master chip may obtain one to-be-activated application. However, because a final state of the master chip is that two applications (namely, the fifth application and the sixth application) are simultaneously activated, a function of simultaneously activating different applications on the security module is still implemented.

Figure 5:
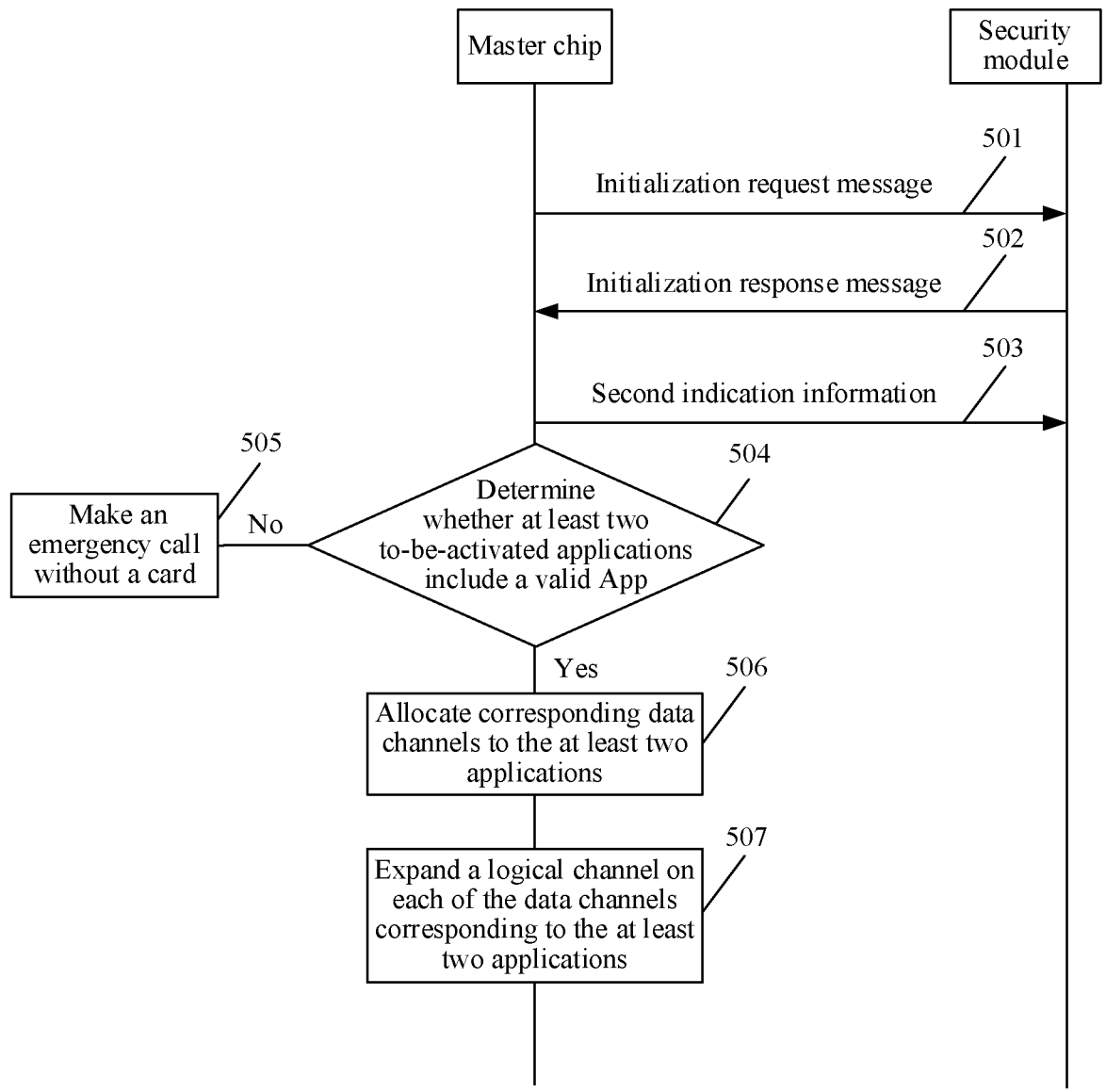
FIG. 5 is a specific schematic flowchart of a terminal application activation method according to an embodiment of this application.

The following describes a terminal application activation method provided in this application with reference to a specific embodiment. FIG. 5 is a specific schematic flowchart of a terminal application activation method according to an embodiment of this application. The method may be applied to a terminal. The terminal includes a master chip and a security module. The terminal application activation method includes at least the following steps.

501: The master chip sends an initialization request message to the security module when the security module is powered on.

A specific manner of powering on the security module may be as follows: The master chip supplies power to the security module. After receiving a power supply voltage of the master chip, the security module starts to work, and executes a security module initialization process, for example, starting an operating system on the security module, and reading capability information of the security module and information about an installed application. The security module may be powered on in an initial power supply manner, a reset and restart manner, a hot start manner, a cold start manner, or the like.

Specifically, when sending the initialization request message to the security module, the master chip may further allocate resources such as a data line and an address line to the security module.

In this embodiment of this application, the master chip may further be connected to the security module through at least one basic data channel, so that the master chip and the security module can complete an initialization process through the basic data channel. The initialization process may include the initialization request message sent by the master chip to the security module, and an initialization response message described subsequently. Alternatively, the master chip and the security module may complete another operation through the basic data channel, for example, whether a new data channel needs to be allocated to a specific application (for example, at least two applications to-be-activated). It may be understood that a function of the basic data channel is not uniquely limited in this embodiment of this application.

502: The security module receives the initialization request message, and sends the initialization response message to the master chip.

The initialization response message includes the application information, and may further include first indication information. The application information includes information about the at least two applications to-be-activated. The first indication information includes capability information used to indicate that the security module supports simultaneous activation of at least two Apps, and may further include information about a maximum quantity of supported data channels. The first indication information may further carry information about a quantity of Apps installed on the security module.

Specifically, the initialization response message may be a power-on answer response message, an answer to reset (answer to reset, ATR) command, an initialization command message supported by a system bus protocol, or the like. It may be understood that a specific form of the initialization response message is not limited in this embodiment of this application.

503: The master chip receives the initialization response message, and sends second indication information to the security module.

The second indication information may be used to indicate capability information of the master chip and/or a device in which the master chip is located. For example, the second indication information includes capability information used to indicate that the master chip supports simultaneous activation of at least two applications. Specifically; the capability information used to indicate that the master chip supports the simultaneous activation of at least two applications may indicate that the master chip and/or the device in which the master chip is located may support simultaneous enabling of a plurality of data channels for different Apps on the security module. The Apps are parallel Apps of a same level on the security module.

Further, the second indication information may include information about a maximum quantity of data channels supported by the master chip. The information about the maximum quantity of data channels supported by the master chip may indicate a maximum quantity of data channels supported by the master chip and/or the device in which the master chip is located. An implementation of the data channel is used as an example. The master chip supports a data bus width of 16 bits to 128 bits. An address line is used between the master chip and the security module to allocate an address to each App. When an App is searched for, an address allocated to the App is found through the address line, and then a data line is used to read data of the App. The data line can transmit data of a CPU to a specified App on the security module, and also transmit data of the specified App on the security module to the CPU. A 16-bit data line may sequentially transmit 16-bit data, and 16 address lines may select a 64K CPU addressing range. Therefore, the different Apps may be distinguished by addresses, to implement simultaneous activation and addressing of the Apps and communication between the Apps and the master chip.

504: The master chip determines, based on the application information included in the initialization response message, whether the at least two applications to-be-activated included in the application information include a valid App: if no valid App is included, step 505 is performed; and if the valid App is included, step 506 is performed.

When the master chip determines whether the at least two applications to-be-activated include the valid App, the master chip may determine, for example, whether the at least two applications to-be-activated include a profile, of an operator, that can be activated. By determining whether there is a profile, the master chip may conveniently determine whether the master chip currently needs to camp on a network.

505: An emergency call without a card is made.

506: The master chip may allocate, based on the obtained at least two applications to-be-activated, corresponding data channels to the at least two applications.

This embodiment of this application provides three possible scenarios in which the corresponding data channels are allocated to the at least two applications. Details may be as follows:

Scenario 1: The master chip may allocate a corresponding data channel to each of the at least two applications to-be-activated. For example, if 10 Apps are installed on the security module, but only four Apps are simultaneously activated, data channels are allocated to only the four activated Apps.

In this scenario, after determining the to-be-activated applications, the master chip may allocate one data channel to each of the to-be-activated applications. In this scenario, a requirement of an application may be maximally met, and the data channel is allocated to each of the to-be-activated applications.

Scenario 2: The master chip may dynamically allocate the data channels based on a quantity of at least two applications to-be-activated and a maximum quantity of currently supported data channels. For example, if a current processing capability of the master chip is limited, or the security module can currently allocate only two data channels, the master chip may allocate corresponding data channels to two to-be-activated Apps, to transfer related parameters and instructions of the two Apps through the corresponding data channels.

In this scenario, the master chip needs to dynamically allocate the data channels to the to-be-activated applications based on the current processing capability: Compared with the scenario 1, in the scenario 2, the data channels are dynamically allocated, to effectively match a processing capability of the master chip or the security module, and improve processing efficiency of the master chip or the security module.

Scenario 3: The master chip may dynamically allocate the data channels based on priorities of the at least two applications to-be-activated and the maximum quantity of currently supported data channels. For example, when a quantity of Apps to be activated by the master chip is greater than the quantity of supported data channels, the master chip preferentially allocates, based on a priority, a data channel to an App whose priority is higher than a reference priority.

In this scenario, the master chip may dynamically allocate the data channels to the to-be-activated applications based on the priorities of the applications and the processing capability: Compared with the scenario 2, in the scenario 3, the data channels may be dynamically allocated based on the priorities of the applications, to avoid that a data channel is allocated to a to-be-activated application because service data of the to-be-activated application is small or application frequency of a user is low. This improves utilization of the data channels.

Specifically, when allocating the corresponding data channels to the at least two applications, the master chip may further determine whether to allocate an application on a new data channel. If yes, an allocation operation is performed. If no, an application (for example, an original application on the data channel) that has a low priority or is temporarily not used is first released based on the priorities, and then the data channels are allocated to the to-be-activated applications.

For example, when it is determined that a new data channel is allocated to a new App 1, the corresponding App 1 is activated on a data channel 1. When it is determined that a new App 2 is activated on an existing data channel 2, for example, a data channel 3 that has a low priority or temporarily does not use an App 3 is released, and the corresponding App 2 is activated on the data channel 2. For example, '04' UICC reset in a refresh command may be used to activate the selected App 2 on the data channel 2.

507: A logical channel (logical channel) is expanded on corresponding data channel, on data channels corresponding to the at least two applications.

For example, a select command or a manage channel command is used to select a master file (master file, MF), a dedicated file (dedicated file, DF), and an elementary file (elementary file, EF) of an App that haves the profile, to open a logical channel. For example, an application protocol data unit (application protocol data unit, APDU) command may be transmitted on the logical channel. When an activated App includes the profile, activation of the profile and a network attach procedure can be completed.

This embodiment of this application provides a method for simultaneously activating a plurality of Apps on the security module. According to this embodiment of this application, a technical effect of information communication, parameter transfer, and instruction transfer between a plurality of Apps on one security module and the master chip can be implemented. According to this embodiment of this application, a case in which two SIM cards need to be deployed in a terminal when dual SIM dual standby is implemented can be resolved. According to this embodiment of this application, profiles of a plurality of SIM cards installed on the security module, and another App can be simultaneously activated, and a plurality of security modules do not need to be deployed. In addition, information communication, parameter transfer, and instruction transfer between a profile and an App that are simultaneously activated on a security module and the master chip are implemented through a bus, so that costs are reduced, and an independent data channel between the Apps is more secure, and has a higher transmission speed and higher transmission efficiency. This improves user security experience.

The following describes in detail an apparatus provided in the embodiments of this application.

Figure 6:
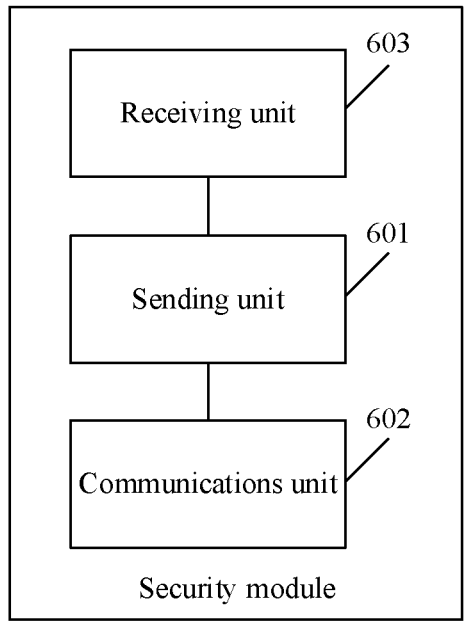
FIG. 6 is a schematic structural diagram of a security module according to an embodiment of this application.

FIG. 6 is a schematic structural diagram of a security module according to an embodiment of this application. The security module may be applied to the foregoing terminal application activation method. As shown in FIG. 6, the security module includes:
- a sending unit 601, configured to send application information of the security module to a master chip, where the application information includes information about at least two applications to-be-activated, and the application information is used to indicate to allocate data channels to the at least two applications; and
- a communications unit 602, configured to: after the master chip allocates a corresponding data channel for each of the at least two applications, perform data communication with the master chip separately through the data channels corresponding to the at least two applications.

Specifically, the communications interface of the security module shown in FIG. 3a may be configured to perform a specific implementation of the sending unit 601, and may be further configured to perform a specific implementation of the step 502. It may be understood that the sending unit 601 may send an initialization response message to the master chip through the basic data channel described in FIG. 5.

Optionally; the processor of the security module shown in FIG. 3a or the CPU on the security module shown in FIG. 3b may be configured to perform an implementation, corresponding to the processor, of the communications unit 603. Optionally, the communications interface shown in FIG. 3a or the peripheral shown in FIG. 3b may also be configured to perform an implementation of the communications unit 603. A specific hardware element corresponding to the communications unit 603 may be determined based on a specific action implemented by the communications unit 603. This is not uniquely limited in this embodiment of this application.

In a possible implementation, the security module shown in FIG. 6 further includes a receiving unit 603, configured to receive an initialization request message from the master chip when the security module is powered on.

The sending unit 601 is specifically configured to send an initialization response message including the application information to the master chip. The initialization response message further includes first indication information. The first indication information includes at least one of capability information used to indicate that the security module supports simultaneous activation of at least two applications and information about a maximum quantity of data channels supported by the security module.

It may be understood that the receiving unit 603 may receive the initialization request message from the master chip through the basic data channel described in FIG. 5.

In a possible implementation, the receiving unit 603 is further configured to receive second indication information from the master chip. The second indication information includes at least one of capability information used to indicate that the master chip supports simultaneous activation of at least two applications and information about a maximum quantity of data channels supported by the master chip.

Figure 7:
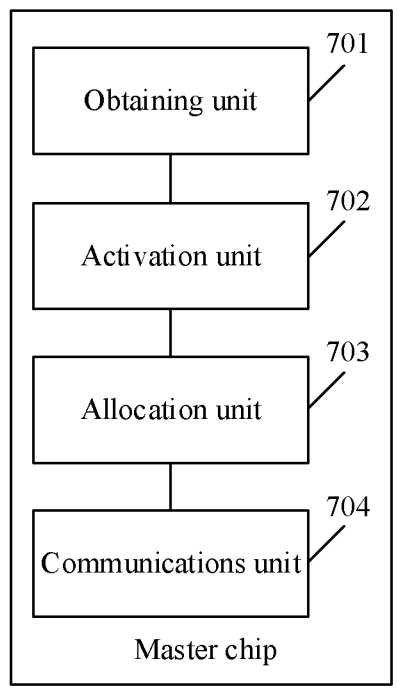
FIG. 7 is a schematic structural diagram of a master chip according to an embodiment of this application.

FIG. 7 is a schematic structural diagram of a master chip according to an embodiment of this application. The master chip may be applied to the foregoing terminal application activation method. As shown in FIG. 7, the master chip includes at least:
- an obtaining unit 701, configured to obtain application information of a security module, where the application information includes information about at least two applications to-be-activated;
- an activation unit 702, configured to activate the at least two applications;
- an allocation unit 703, configured to allocate a corresponding data channel for each of the at least two applications; and
- a communications unit 704, configured to perform data communication with the at least two applications separately through data channels corresponding to the at least two applications.

It may be understood that the processor of the master chip shown in FIG. 3a and the master CPU of the master chip shown in FIG. 3b may be configured to perform specific implementations of the activation unit 702 and the allocation unit 703. The processor of the master chip shown in FIG. 3a may also be configured to perform a specific implementation of the obtaining unit 701, or the communications interface of the master chip shown in FIG. 3a is configured to perform the specific implementation of the obtaining unit 701. A specific implementation is not limited in this embodiment of this application.

Figure 8:
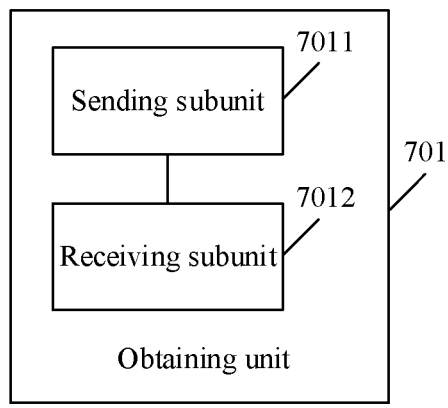
FIG. 8 is a schematic structural diagram of an obtaining unit according to an embodiment of this application.

In a possible implementation, as shown in FIG. 8, the obtaining unit 701 includes:
- a sending subunit 7011, configured to send an initialization request message to the security module when the security module is powered on; and
- a receiving subunit 7012, configured to receive an initialization response message including the application information from the security module, where the initialization response message further includes first indication information, and the first indication information includes at least one of capability information used to indicate that the security module supports simultaneous activation of at least two applications and information about a maximum quantity of data channels supported by the security module.

In a possible implementation, the sending subunit 7011 is further configured to send second indication information to the security module. The second indication information includes at least one of capability information used to indicate that the master chip supports simultaneous activation of at least two applications and information about a maximum quantity of data channels supported by the master chip.

In a possible implementation, the allocation unit 703 is specifically configured to: when a first quantity is less than or equal to a second quantity, allocate the corresponding data channel for each of the at least two applications. The first quantity is a quantity of the at least two applications. The second quantity is the maximum quantity of data channels supported by the security module.

In a possible implementation, the allocation unit 703 is specifically configured to: when the first quantity is greater than the second quantity, determine a first application from the at least two applications and allocate a corresponding data channel for each of the first application. A priority of the first application is higher than a reference priority, and a quantity of first applications is less than or equal to the second quantity.

In a possible implementation, the at least two applications include a second application. The allocation unit 703 is specifically configured to: when the data channel has been allocated to a third application, release the third application and allocate the data channel to the second application. A priority of the second application is higher than a priority of the third application. The third application does not belong to an application of the at least two applications.

In a possible implementation, when the second application is a network access application NAA, the data channel is a data channel between the security module and a modem. Alternatively, when the second application is a non-NAA, the data channel is a data channel between the security module and a central processing unit.

In a possible implementation, the first indication information further includes at least one of information about a quantity of applications installed on the security module and information about a maximum quantity of applications that can be installed on the security module.

Figure 9:
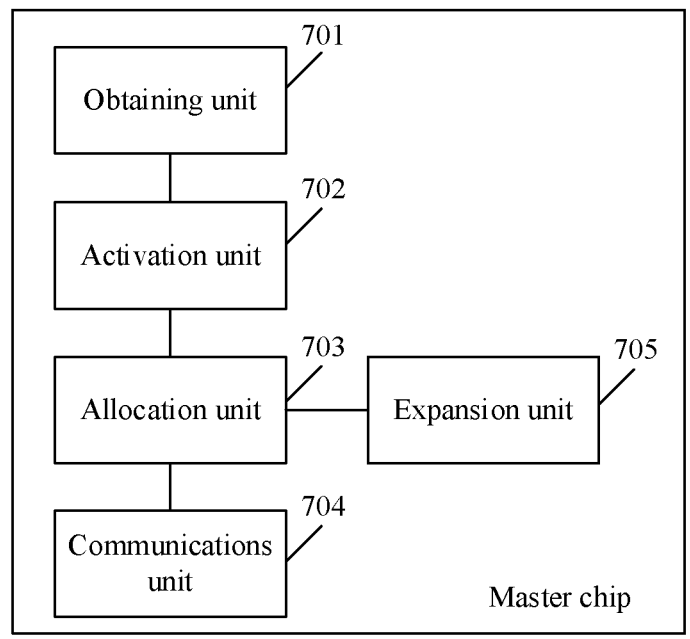
FIG. 9 is a schematic structural diagram of another master chip according to an embodiment of this application.

In a possible implementation, as shown in FIG. 9, the master chip further includes an expansion unit 705, configured to expand at least two logical channels based on the data channel.

It may be understood that the processor of the master chip shown in FIG. 3*a* and the master CPU of the master chip shown in FIG. 3*b* may be configured to perform a specific implementation of the expansion unit 705.

For specific implementations of the security module shown in FIG. 6 and the master chip shown in FIG. 7 to FIG. 9, refer to specific implementations in FIG. 4 and FIG. 5. Details are not described herein again.

Figure 10:
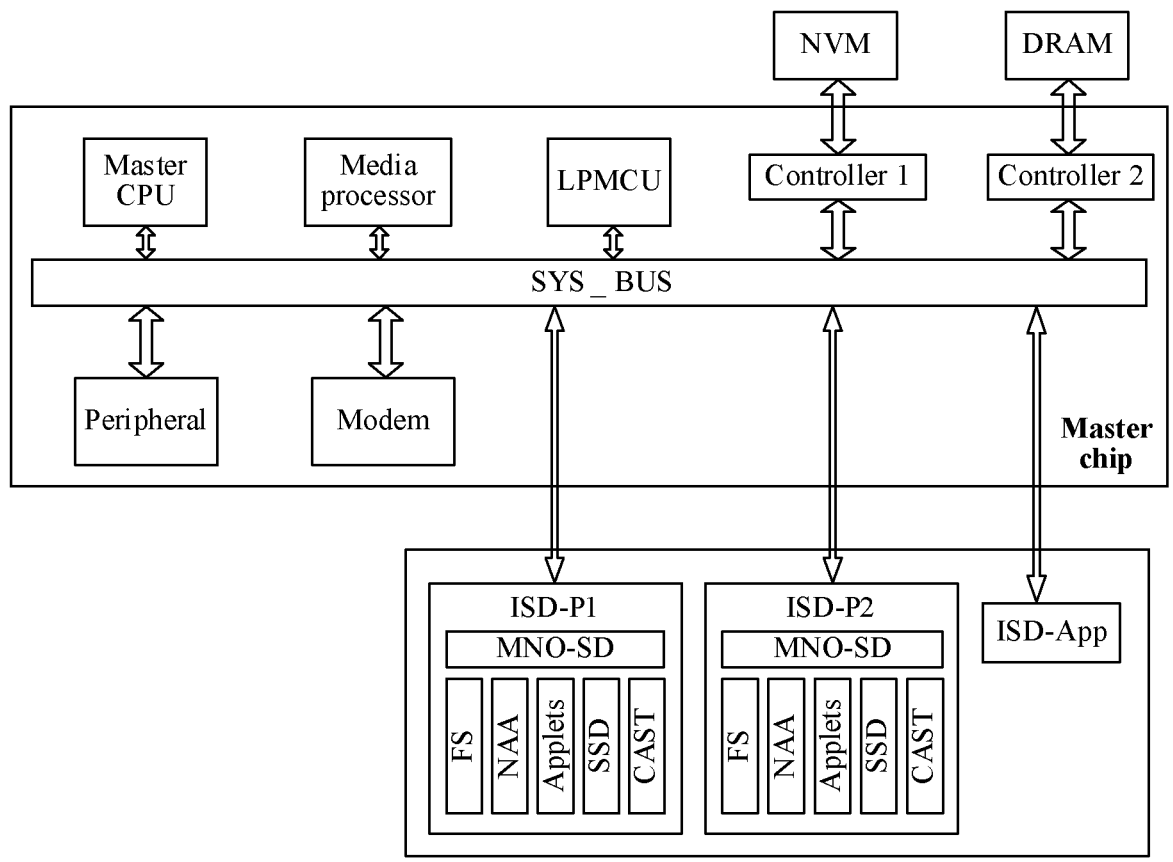
FIG. 10 is a diagram of an architecture scenario of a terminal application activation system according to an embodiment of this application.

FIG. 10 is a diagram of an architecture scenario of a terminal application activation system according to an embodiment of this application. As shown in FIG. 10, the following uses an example in which two Apps of a profile type are installed on a security module. To be specific, two issuer security domain profiles (issuer security domain profile, ISD-P), ISD-P 1 and ISD-P 2 are created on the security module, and profiles of two operators are separately installed into the corresponding ISD-P 1 and ISD-P 2. Each ISD-P is distinguished by a different application identifier (application identifier, AID).

For example, when a mailbox is used for implementation, 0-bit bus to 32-bit bus may correspond to 0 to 32 data channels, and are configured to transmit a hardware signal. Different data storage areas in the mailbox are allocated to different hardware signals. One mailbox corresponds to one data channel. A plurality of mailboxes correspond to a plurality of corresponding data channels, and are allocated to different Apps on the security module for use. For example, an App 1 occupies a first data channel, and an App 2 occupies a second data channel. Different mailbox addresses are allocated to distinguish different data channels. Further, a master chip and the security module may distinguish uplink and downlink data, a logical address, a physical address, and the like based on the different mailbox addresses. In addition, a memory management unit (memory management unit, MMU) mapping address may also be used to distinguish the data channels. Optionally, the master chip and the security module may further be instructed to obtain data in the mailbox through an interrupt mechanism, for example, an external interrupt (a hardware interrupt) or an internal interrupt (a software interrupt). Different interrupt sources correspond to interrupt service subprograms, and are stored in different allocated storage areas. An interrupt source identifier is allocated. In addition, different interrupt priorities may be allocated to the different Apps to establish the data channels.

Optionally, an I2C may be used to connect the master chip and the security module, and is used as a data channel allocated to the different Apps on the security module, to transfer information and an instruction of the different Apps.

Optionally, a serial peripheral interface (serial peripheral interface, SPI) may be used to connect the master chip and the security module, and is used as the data channel allocated to the different Apps on the security module, to transmit the information and the instruction of the different Apps. It may be understood that the foregoing manners are not uniquely limited in this embodiment of this application.

Based on the descriptions of the master chip and the security module, an embodiment of this application provides a terminal. The terminal includes the master chip and the security module, and the master chip is connected to the security module through at least two data channels.

The master chip is configured to: obtain application information of the security module: activate at least two applications, and allocates a corresponding data channel for each of the at least two applications; and perform data communication with the at least two applications separately through data channels corresponding to the at least two applications. The application information includes information about at least two applications to-be-activated.

Optionally; the master chip is further configured to send an initialization request message to the security module when the security module is powered on. The security module is configured to send an initialization response message including the application information to the master chip. The initialization response message further includes first indication information. The first indication information includes at least one of capability information used to indicate that the security module supports simultaneous activation of at least two applications and information about a maximum quantity of data channels supported by the security module. The master chip is further configured to receive the initialization response message.

Optionally, the master chip is further configured to send second indication information to the security module. The second indication information includes at least one of capability information used to indicate that the master chip supports simultaneous activation of at least two applications and information about a maximum quantity of data channels supported by the master chip.

Optionally, the master chip is specifically configured to: when a first quantity is less than or equal to a second quantity; allocate the corresponding data channel for each of the at least two applications. The first quantity is a quantity of the at least two applications. The second quantity is the maximum quantity of data channels supported by the security module.

Optionally, the master chip is specifically configured to: when the first quantity is greater than the second quantity; determine a first application from the at least two applications and allocate a corresponding data channel for each of the first application. A priority of the first application is higher than a reference priority, and a quantity of first applications is less than or equal to the second quantity:

Optionally, the at least two applications include a second application. The master chip is specifically configured to: when the data channel has been allocated to a third application, release the third application and allocate the data channel to the second application. A priority of the second application is higher than a priority of the third application. The third application does not belong to an application of the at least two applications.

Optionally, when the second application is a network access application NAA, the data channel is a data channel between the security module and a modem. Alternatively, when the second application is a non-NAA, the data channel is a data channel between the security module and a central processing unit.

Optionally, the first indication information further includes a quantity of applications installed on the security module and/or a maximum quantity of applications that can be installed on the security module.

Optionally, the master chip is further configured to expand at least two logical channels based on the data channel.

It may be understood that for a specific implementation of this embodiment of this application, refer to the specific implementations described in FIG. 4 and FIG. 5. Details are not described herein again.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (digital subscriber line, DSL)) or a wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a soft disk, a hard disk, or a magnetic tape), an optical medium (for example, a digital versatile disc (digital versatile disc, DVD), a semiconductor medium (for example, a solid-state drive (solid state disk, SSD)), or the like.

A person of ordinary skill in the art may understand that all or some of the procedures of the methods in the embodiments may be implemented by a computer program instructing related hardware. The program may be stored in a computer-readable storage medium. When the program is run, the procedures of the methods in the embodiments may be performed. The foregoing storage medium includes: any medium that can store program code, such as a read-only memory (read-only memory, ROM), a random access memory (random access memory, RAM), a magnetic disk, or an optical disc.

What is claimed is:

1. A method comprising:
obtaining application information of a security system of a terminal through at least two data channels, wherein the application information comprises information about at least two applications to be activated, and wherein each of the at least two data channels is a physical channel;

activating the at least two applications;

allocating, based on a quantity of the at least two applications and a maximum quantity of data channels that are supported by the security system, a corresponding data channel from the at least two data channels for each of the at least two applications, wherein a priority of each of the at least two applications is different; and performing data communication with the at least two applications separately through data channels from the at least two data channels corresponding to the at least two applications.

2. The method of claim 1, further comprising:

sending an initialization request message to the security system when the security system is powered on; and receiving an initialization response message from the security system, wherein the initialization response message comprises the application information and first indication information, wherein the first indication information comprises at least one of first capability information indicating that simultaneous activation of the at least two applications is supported or first information about a first maximum quantity of data channels that are supported.

3. The method of claim 2, wherein after receiving the initialization response message, the method further comprises sending second indication information to the security system, wherein the second indication information comprises at least one of second capability information indicating simultaneous activation of the at least two applications or second information about a second maximum quantity of data channels that are supported by the master chip.

4. The method of claim 2, further comprising allocating the corresponding data channel for each of the at least two applications when the quantity of the at least two applications is less than or equal to the first maximum quantity of data channels.

5. The method of claim 4, further comprising allocating a first corresponding data channel from the at least two data channels for each application when the quantity of the at least two applications is greater than the first maximum quantity of data channels, wherein a priority of the application is higher than a reference priority, and wherein a first quantity of the application is less than or equal to the first maximum quantity of data channels.

6. The method of claim 2, wherein the first indication information further comprises at least one of information about a quantity of applications installed on the security system or information about a maximum quantity of applications that can be installed on the security system.

7. The method of claim 1, wherein the at least two applications comprise a second application, and wherein when a first corresponding data channel from the at least two data channels has been allocated to a first application that does not belong to the at least two applications, the method further comprises:

releasing the first application; and allocating the first corresponding data channel to the second application, wherein a priority of the second application is higher than a priority of the first application.

8. The method of claim 7, wherein the first corresponding data channel is between the security system and a modem, and wherein the first application is a network access application (NAA).

9. The method of claim 1, further comprising expanding at least two logical channels based on the corresponding data channel.

10. The method of claim 7, wherein the first corresponding data channel is between the security system and a central processing unit when the first application is a non-network access application (NAA).

11. A system comprising:

a security system comprising application information, wherein the application information comprises information about at least two applications to be activated; and a master chip coupled to the security system through at least two data channels and configured to:

obtain the application information, wherein each of the at least two data channels is a physical channel;

activate the at least two applications;

allocate, based on a quantity of the at least two applications and a maximum quantity of data channels that are supported by the security system, a corresponding data channel for each of the at least two applications, wherein a priority of each of the at least two applications is different; and perform data communication with the at least two applications separately through data channels corresponding to the at least two applications.

12. The system of claim 11, wherein the master chip is further configured to send an initialization request message to the security system when the security system is powered on, wherein the security system is configured to send an initialization response message comprising the application information and first indication information to the master chip, wherein the first indication information comprises at least one of first capability information indicating that the security system supports simultaneous activation of at least two applications or first information about a first maximum quantity of data channels supported by the security system, and wherein the master chip is further configured to receive the initialization response message.

13. The system of claim 12, wherein the master chip is further configured to send second indication information comprising at least one of second capability information indicating that the master chip supports simultaneous activation of at least two applications or second information about a second maximum quantity of data channels supported by the master chip to the security system.

14. The system of claim 12, wherein the master chip is further configured to allocate the corresponding data channel for each of the at least two applications when the quantity of the at least two applications is less than or equal to the first maximum quantity of data channels.

15. The system of claim 14, wherein when the quantity of the at least two applications is greater than the first maximum quantity of data channels, the master chip is further configured to allocate a first corresponding data channel from the at least two data channels for each first application of at least one first application from the at least two applications, wherein a priority of the at least one first application is higher than a reference priority, and wherein a first quantity of the at least one first application is less than or equal to the first maximum quantity of data channels.

16. The system of claim 12, wherein the first indication information further comprises a quantity of applications installed on the security system or a maximum quantity of applications that can be installed on the security system.

17. The system of claim 11, wherein the at least two applications comprise a second application, and wherein when a first corresponding data channel from the at least two data channels has been allocated to a first application that does not belong to the at least two applications, the master chip is further configured to:
   release the first application; and
   allocate the first corresponding data channel to the second application, wherein a priority of the second application is higher than a priority of the first application.

18. The system of claim 17, wherein the first corresponding data channel is between the security system and a modem when the first application is a network access application (NAA), and wherein the first corresponding data channel is between the security system and a central processing unit when the first application is a non-network access application (NAA).

19. The system of claim 11, wherein the master chip is further configured to expand at least two logical channels based on the corresponding data channel.

20. An apparatus comprising:
   a master chip; and
   a processor coupled to the master chip and configured to:
      control the master chip to obtain application information comprising information about at least two applications to be activated;
      control the master chip to activate the at least two applications;
      control the master chip to allocate, based on a quantity of the at least two applications and a maximum quantity of data channels that are supported by the security system, a corresponding data channel from at least two data channels for each of the at least two applications, wherein a priority of each of the at least two applications is different, and wherein each of the at least two data channels is a physical channel; and
      control the master chip to perform data communication with the at least two applications separately through data channels from the at least two data channels corresponding to the first applications.

* * * * *